US012775412B2

(12) United States Patent
Venkatachalam

(10) Patent No.: US 12,775,412 B2
(45) Date of Patent: Oct. 27, 2026

(54) ERASE SUSPEND MODE DURING A SANITIZE OPERATION FOR A MEMORY SYSTEM

(71) Applicant: Micron Technology, Inc., Boise, ID (US)

(72) Inventor: Ramkumar Venkatachalam, Bangalore (IN)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 19/222,942

(22) Filed: May 29, 2025

(65) Prior Publication Data

US 2025/0390247 A1 Dec. 25, 2025

Related U.S. Application Data

(60) Provisional application No. 63/662,190, filed on Jun. 20, 2024.

(51) Int. Cl.
*G06F 12/00* (2006.01)
*G06F 3/06* (2006.01)

(52) U.S. Cl.
CPC .......... *G06F 3/0652* (2013.01); *G06F 3/0604* (2013.01); *G06F 3/0679* (2013.01)

(58) Field of Classification Search
CPC .... G06F 3/0679; G06F 3/0604; G06F 3/0613; G06F 3/0634; G06F 3/0652; G06F 3/0659; G06F 12/0246; G06F 21/79; G06F 2212/7207; G06F 3/0623; G06F 3/0655; G06F 3/0673; G06F 9/485
See application file for complete search history.

(56) References Cited

U.S. PATENT DOCUMENTS

2012/0278564 A1* 11/2012 Goss .......................... G06F 12/00 711/155
2017/0285969 A1 10/2017 Madraswala et al.
2021/0151112 A1 5/2021 Shin
(Continued)

OTHER PUBLICATIONS

"International Search Report and Written Opinion of the International Searching Authority," issued in connection with Int'l Appl. No. PCT/US2025/033628, dated Oct. 17, 2025 (11 pages).

*Primary Examiner* — Yong J Choe
(74) *Attorney, Agent, or Firm* — Holland & Hart LLP

(57) ABSTRACT

Methods, systems, and devices for erase suspend mode settings during a sanitize operation for a memory system are described. A memory system may disable automatic suspends during a sanitize operation. The memory system may receive a sanitize command and may issue a command to switch one or more memory devices from a first suspend mode associated with automatic suspensions during erase operations to a second suspend mode that does not support automatic suspensions. The memory system may perform a series of erase operations to sanitize the system in response to the sanitize command without interruption based on switching to the second suspend mode. The memory system may issue another command to switch back to the first suspend mode after the sanitize operation is complete, such that the memory system may continue to periodically suspend or pause during other types of erase operations.

25 Claims, 5 Drawing Sheets

(56) References Cited

U.S. PATENT DOCUMENTS

| | | | | |
|---|---|---|---|---|
| 2021/0279094 | A1 | 9/2021 | Park et al. | |
| 2023/0043502 | A1 | 2/2023 | Cariello | |
| 2023/0195333 | A1 | 6/2023 | Ji et al. | |
| 2026/0044598 | A1 * | 2/2026 | Helmick | G06F 21/554 |

* cited by examiner

ERASE SUSPEND MODE DURING A SANITIZE OPERATION FOR A MEMORY SYSTEM

CROSS REFERENCE

The present Application for Patent claims priority to U.S. Patent Application No. 63/662,190 by Venkatachalam, entitled "ERASE SUSPEND MODE DURING A SANITIZE OPERATION FOR A MEMORY SYSTEM," filed Jun. 20, 2024, which is assigned to the assignee hereof, and which is expressly incorporated by reference in its entirety herein.

TECHNICAL FIELD

The following relates to one or more systems for memory, including techniques for an erase suspend mode during a sanitize operation for a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

DETAILED DESCRIPTION

Figure 1:
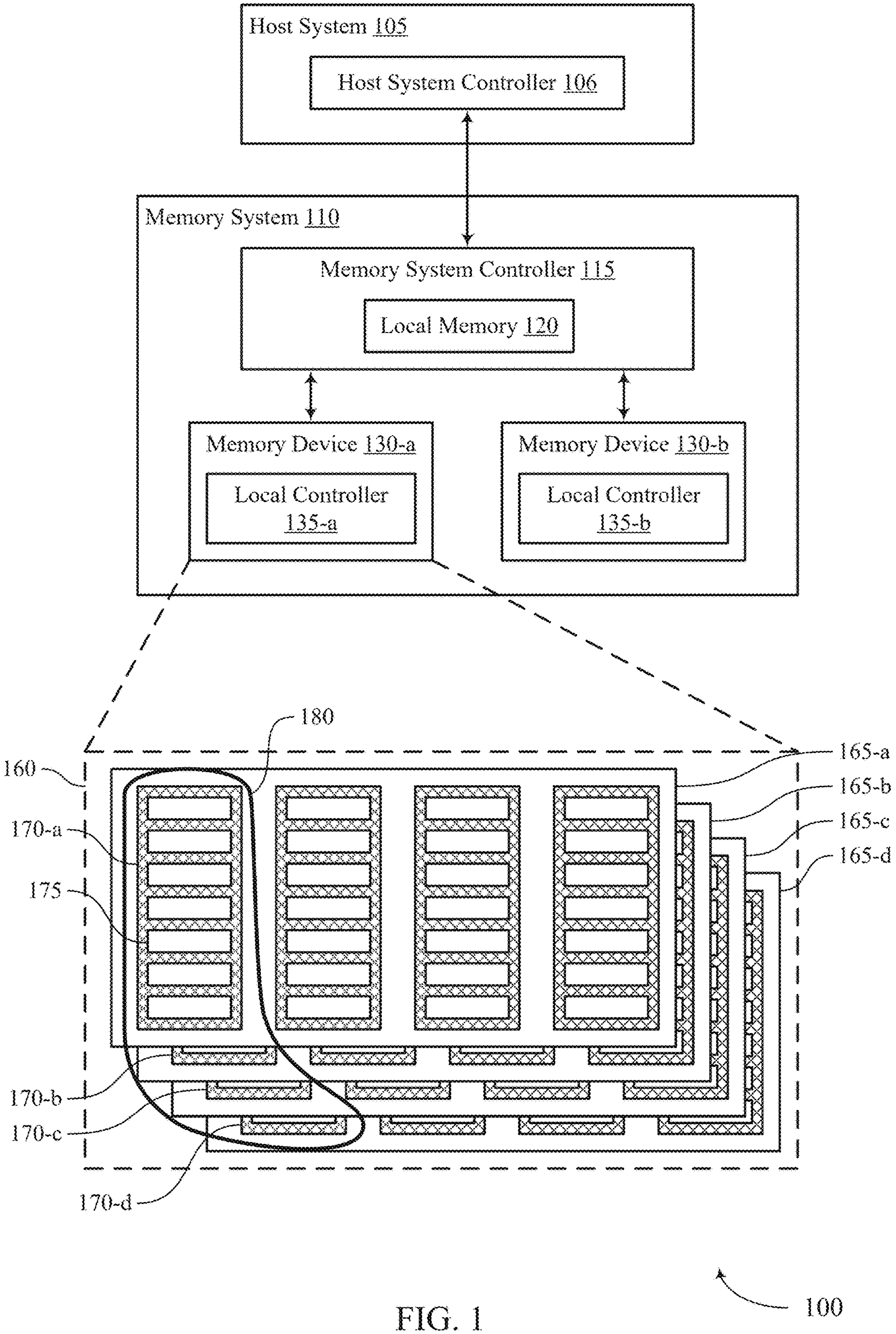
FIG. 1 shows an example of a system that supports techniques for an erase suspend mode during a sanitize operation for a memory system in accordance with examples as disclosed herein.

A memory system may apply one or more erase voltage pulses across one or more blocks of memory cells to erase the data stored by the memory cells. In some examples, a memory system may support an erase suspend feature (e.g., an erase suspend), in which erase operations may be suspended (e.g., paused) between erase voltage pulses so that memory accesses (e.g., writes, reads, other input/output (I/O) operations) may be performed. A memory system may support a first type of suspend procedures (e.g., auto-fixed suspends) in which the memory system performs erase suspensions periodically, the memory system may support a second type of suspend procedures (e.g., on-demand suspends), in which the memory system performs erase suspensions in response to detection of an I/O command, the memory system may support one or more other types of suspend procedures, or any combination thereof.

A sanitize operation by the memory system may include an operation to erase a chunk of data (e.g., a relatively large chunk of data) from the memory system. For example, a sanitize operation may delete all namespaces on a specified drive of the memory system. The sanitize operation may alter user data in the drive such that the previous user data cannot be recovered from the memory. That is, the sanitize operation may include one or more operations to permanently delete or otherwise remove data from a storage device, such as a drive, of the memory system. The sanitize operation may include a sequence of erase operations. For example, a host may trigger a sanitize operation to irreversibly delete or otherwise remove data from the memory system (e.g., wipe an entire drive). The host system may refrain from (e.g., be disallowed from or otherwise indicated to refrain from) transmitting I/O commands to the memory system during the sanitize operation. However, if the memory system supports a first suspend mode that supports automatic suspend procedures during erase operations, the memory system may periodically suspend the erase operations during the sanitize operation (e.g., between erase voltage pulses), even though the memory system does not receive any access commands. Such suspensions during a sanitize operation may thereby cause excess latency, which may reduce performance of the memory system.

Techniques described herein provide for the memory system to disable the automatic suspend procedures during a sanitize operation. For example, if the memory system receives a sanitize command, the memory system may issue a command or other indication (e.g., a set feature command, some other type of command) to switch one or more memory devices from the first suspend mode to a second suspend mode that is associated with no suspend procedures or on-demand suspend procedures (e.g., in response to detection of a command), but does not support automatic suspend procedures. The second suspend mode may thereby disable the periodic suspension procedures during erase operations, so that the memory system may perform the series of erase operations to sanitize the system without interruption, thereby decreasing latency and improving a reliability of the sanitize operation. The memory system may issue another command or other indication to switch back to the first suspend mode after the sanitize operation is complete, such that the memory system may continue to periodically suspend (e.g., pause) during other types of erase operations.

In addition to applicability in memory systems as described herein, techniques for erase suspend mode during a sanitize operation for a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by reducing latency and improving reliability of sanitize operations, which may improve memory storage reliability and improve memory access speeds. The described techniques may thereby decrease processing or latency times, improve response times, or otherwise improve user experience, among other benefits.

Features of the disclosure are illustrated and described in the context of systems, devices, and circuits. Features of the disclosure are further illustrated and described in the context of a process flow and flowcharts.

FIG. 1 shows an example of a system 100 that supports erase suspend mode during a sanitize operation for a memory system in accordance with examples as disclosed herein. The system 100 includes a host system 105 coupled with a memory system 110. The system 100 may be included in a computing device such as a desktop computer, a laptop computer, a network server, a mobile device, a vehicle, an Internet of Things (IOT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-*a* and 130-*b* are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hard-coded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof. Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on the same die, within the same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-*a* may include a local controller 135-*a* and a memory device 130-*b* may include a local controller 135-*b*.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, a NAND memory device 130 may include memory cells configured to each store one bit of information, which may be referred to as single level cells (SLCs). Additionally, or alternatively, a NAND memory device 130 may include memory cells configured to each store multiple bits of information, which may be referred to as multi-level cells (MLCs) if configured to each store two bits of information, as tri-level cells (TLCs) if configured to each store three bits of information, as quad-level cells (QLCs) if configured to each store four bits of information, or more generically as multiple-level memory cells. Multiple-level memory cells may provide greater density of storage relative to SLC memory cells but may, in some cases, involve narrower read or write margins or greater complexities for supporting circuitry.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-*a*, 170-*b*, 170-*c*, and 170-*d* that are within planes 165-*a*, 165-*b*, 165-*c*, and 165-*d*, respectively, and blocks 170-*a*, 170-*b*, 170-*c*, and 170-*d* may be collectively referred to as a virtual block 180. In some cases, a virtual block may include blocks 170 from different memory devices 130 (e.g., including blocks in one or more planes of memory device 130-*a* and memory device 130-*b*). In some cases, the blocks 170 within a virtual block may have the same block address within their respective planes 165 (e.g., block 170-*a* may be "block 0" of plane 165-*a*, block 170-*b* may be "block 0" of plane 165-*b*, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

In some cases, a block 170 may include memory cells organized into rows (pages 175) and columns (e.g., strings, not shown). For example, memory cells in the same page 175 may share (e.g., be coupled with) a common word line, and memory cells in the same string may share (e.g., be coupled with) a common digit line (which may alternatively be referred to as a bit line).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some cases, to update some data within a block 170 while retaining other data within the block 170, the memory device 130 may copy the data to be retained to a new block 170 and write the updated data to one or more remaining pages of the new block 170. The memory device 130 (e.g., the local controller 135) or the memory system controller 115 may mark or otherwise designate the data that remains in the old block 170 as invalid or obsolete and may update a logical-to-physical (L2P) mapping table to associate the logical address (e.g., LBA) for the data with the new, valid block 170 rather than the old, invalid block 170. In some cases, such copying and remapping may be performed instead of erasing and rewriting the entire old block 170 due to latency or wearout considerations, for example. In some cases, one or more copies of an L2P mapping table may be stored within the memory cells of the memory device 130 (e.g., within one or more blocks 170 or planes 165) for use (e.g., reference and updating) by the local controller 135 or memory system controller 115.

In some cases, L2P mapping tables may be maintained and data may be marked as valid or invalid at the page level of granularity, and a page 175 may contain valid data, invalid data, or no data. Invalid data may be data that is outdated, which may be due to a more recent or updated version of the data being stored in a different page 175 of the memory device 130. Invalid data may have been previously programmed to the invalid page 175 but may no longer be associated with a valid logical address, such as a logical address referenced by the host system 105. Valid data may be the most recent version of such data being stored on the memory device 130. A page 175 that includes no data may be a page 175 that has never been written to or that has been erased.

In some cases, a memory system controller 115 or a local controller 135 may perform operations (e.g., as part of one or more media management algorithms) for a memory device 130, such as wear leveling, background refresh, garbage collection, scrub, block scans, health monitoring, or others, or any combination thereof. For example, within a memory device 130, a block 170 may have some pages 175 containing valid data and some pages 175 containing invalid data. To avoid waiting for all of the pages 175 in the block 170 to have invalid data in order to erase and reuse the block 170, an algorithm referred to as "garbage collection" may be invoked to allow the block 170 to be erased and released as a free block for subsequent write operations. Garbage collection may refer to a set of media management operations that include, for example, selecting a block 170 that contains valid and invalid data, selecting pages 175 in the block that contain valid data, copying the valid data from the selected pages 175 to new locations (e.g., free pages 175 in another block 170), marking the data in the previously selected pages 175 as invalid, and erasing the selected block 170. As a result, the quantity of blocks 170 that have been erased may be increased such that more blocks 170 are available to store subsequent data (e.g., data subsequently received from the host system 105).

In some examples, the memory system 110 (e.g., the memory system controller 115, a local controller 135, or both) may receive an erase command from the host system 105 or some other component. The memory system 110 may perform one or more erase operations in response to the erase command. For example, the memory system 110 may apply one or more erase voltage pulses across one or more blocks 170 of memory cells to erase the data stored by the memory cells. In some examples, the memory system 110 may support an erase suspend feature, in which erase operations may be suspended (e.g., paused) between erase voltage pulses so that memory accesses (e.g., writes, reads, other input/output (I/O) operations) may be performed.

The memory system 110 may support a first type of suspends (e.g., auto-fixed suspends) in which the memory system 110 performs erase suspensions periodically or at some other fixed time intervals. That is, the memory system 110 (e.g., NAND) may automatically suspend at fixed internals, making forward progress without any prompt from a user (e.g., the host system 105). The periodicity or other fixed time intervals may be defined by a standard, a device specification, a configuration of the memory system 110, or any combination thereof. In some examples, the points for suspension may be defined per segment or portion of an erase operation. For example, a first suspension point may occur at some time after a start of a program-before-erase (PBE) operation, a second suspension point may occur at some time after a start of a first erase pulse is applied, a third suspension point may occur at some time after an erase pulse verification is failed, a fourth suspension point may occur at some time after a second erase pulse is applied, a fifth suspension point may occur at some time after an erase pulse verification passes, and the like. Other examples of fixed suspension intervals may be defined. In some examples, a series of erases may be performed according to an erase algorithm, in which a PBE operation is performed, followed by one or more iterations of an erase pulse application and an erase pulse verification until the verification passes. If the memory system 110 suspends for at least a time period during each iteration of the erase algorithm, the latency associated with the suspensions may be relatively high (e.g., up to six erase loops per erase for QLC memory, with one suspension per iteration and one suspension per PBE operation may correspond to 13 suspensions during the erase of a QLC memory).

Additionally, or alternatively, the memory system 110 may support a second type of suspends (e.g., on-demand suspends), in which the memory system 110 performs erase suspensions in response to detection of a suspend command or some other I/O command. For example, if the memory system 110 supports the first type of suspends, the memory system 110 may pause between application of each erase voltage pulse and check a buffer or other command queue of the memory system 110 for any commands. If there are any commands detected, the memory system 110 may execute the commands during the suspension. The memory system 110 may initiate a resume of the erase operation after executing the operation (e.g., by detecting suspend status SR[2]=1). If the memory system 110 supports the second type of suspends, the memory system 110 may apply the one or more erase voltage pulses continuously (e.g., sequentially, back-to-back) without a pause unless the memory system 110 detects an I/O command from the host system 105. If the memory system 110 detects an I/O command or a suspend command from the host system 105 or elsewhere in the memory system 110 (e.g., from the memory system controller 115), the memory system 110 may pause the erase operation (e.g., between two voltage pulses) in response to the detection to execute the operation indicated via the I/O command. The memory system 110 may resume the erase operation after the operation is executed. In some examples, the memory system controller 115, the host system 105 may issue a suspend command during an auto-fixed suspend segment (e.g., in between fixed time intervals) if the memory system 110 is in need of a suspension faster than the fixed segments may provide. In some examples, the memory system 110 may support both types of suspends as part of a first suspend mode. That is, the memory system 110 may pause periodically and on-demand during erase operations. In some examples, every time a suspend is performed during an erase, the memory device 130 that performs the suspension may transmit a status indication to the memory system controller 115, and the memory system controller 115 may issue one or more I/O operations to the memory device 130 to perform during the suspension.

A sanitize operation by the memory system 110 may include an operation to erase a relatively large chunk of data from the memory system 110. For example, a sanitize operation may delete all namespaces on a specified drive of the memory system 110 (e.g., an entire die 160, or some other chunk of data in the memory system 110). The sanitize operation may alter user data in the drive such that the previous user data cannot be recovered from the memory. That is, the sanitize operation may include one or more operations to permanently delete or otherwise destroy data from a storage device. The sanitize operation may include a sequence of erase operations. For example, the host system 105 may trigger a sanitize operation to irreversibly remove data from the memory system 110 (e.g., wipe an entire drive). The host system may transmit a sanitize command (e.g., NVMe Sanitize) to trigger the sanitize operation. The host system 105 may refrain from transmitting I/O commands to the memory system 110 during the sanitize operation based on one or more rules or other configurations associated with the sanitize operation. However, if the memory system 110 supports the first suspend mode that supports automatic suspends during erases, the memory system 110 may periodically suspend the erase operations during the sanitize operation (e.g., between erase voltage pulses), even though the memory system 110 does not receive any access commands. Such suspensions during a sanitize operation may thereby cause excess latency, which may reduce performance of the memory system 110.

Techniques described herein provide for the memory system 110 to disable the automatic suspends during a sanitize operation. For example, if the memory system 110 receives a sanitize command, the memory system 110 may issue a command (e.g., a set feature command or some other type of command) to switch one or more memory devices 130 from the first suspend mode to a second suspend mode that is associated with no suspends or on-demand suspends (e.g., in response to detection of a command), but does not support automatic suspends. The second suspend mode may thereby disable the periodic suspensions during erase operations, so that the memory system 110 may perform the series of erase operations to sanitize the system without interruption, thereby decreasing latency and improving a reliability of the sanitize operation. The memory system 110 may issue another command to switch back to the first suspend mode after the sanitize operation is complete, such that the memory system 110 may continue to periodically suspend or pause during other types of erase operations. The memory system 110 may update a sanitize status log page, or otherwise indicate a status of the sanitize operation to the host system 105 during the sanitize operation. The host system 105 may refrain from issuing any I/O commands until the sanitize operation is complete.

In some examples, the types of suspends (which may be referred to as suspend procedures) and corresponding suspend mode may be per-memory device 130, per die 160, and/or some other granularity within the memory system 110. For example, each memory device 130 may operate according to a respective suspend mode. The one or more commands issued by the memory system 110 may include set feature commands, among other types of commands, issued from the memory system controller 115, for example, to each of the one or more memory devices 130. In some examples, each command may include an address of an intended or target memory device 130 and a value that indicates either the first suspend mode or the second suspend mode. A memory device 130 (e.g., a local controller 135) may receive the set feature command with an address of the memory device 130 and determine whether to switch suspend modes based on the value. Thus, the memory device 130-*a* may operate according to the first suspend mode, while the memory device 130-*b* may operate according to the second suspend mode, or vice versa. The memory devices 130 may thereby erase data within the memory blocks 170 of the memory dies 160 during erase operations, sanitize operations, or both (among other examples) according to a respective suspend mode based on set feature commands received from the memory system controller 115.

Figure 2:
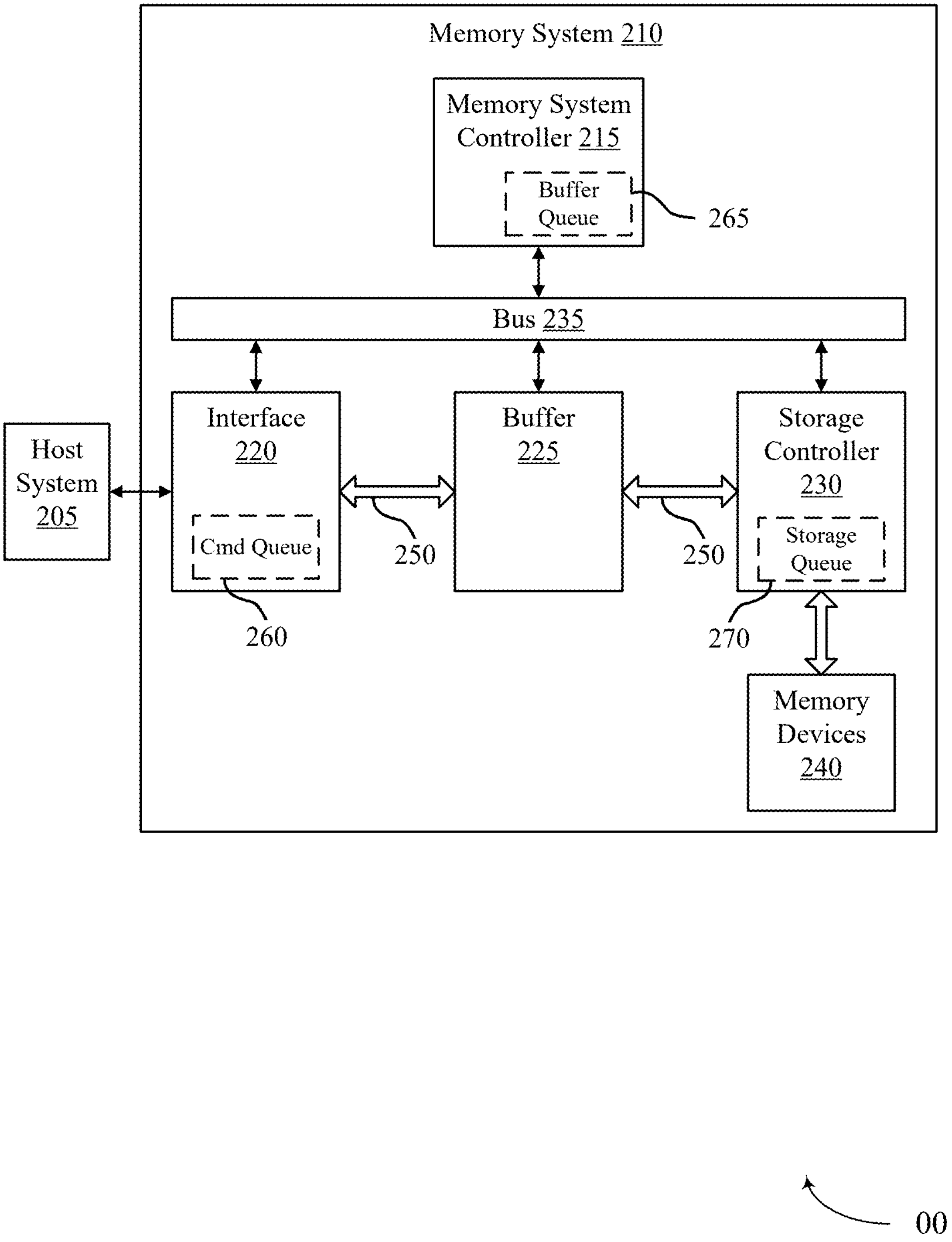
FIG. 2 shows an example of a system that supports techniques for an erase suspend mode during a sanitize operation for a memory system in accordance with examples as disclosed herein.

FIG. 2 shows an example of a system 200 that supports erase suspend mode during a sanitize operation for a memory system in accordance with examples as disclosed herein. The system 200 may be an example of a system 100 as described with reference to FIG. 1, or aspects thereof. The system 200 may include a memory system 210 configured to store data received from the host system 205 and to send data to the host system 205, if requested by the host system 205 using access commands (e.g., read commands or write commands). The system 200 may implement aspects of the system 100 as described with reference to FIG. 1. For example, the memory system 210 and the host system 205 may be examples of the memory system 110 and the host system 105, respectively.

The memory system 210 may include one or more memory devices 240 to store data transferred between the memory system 210 and the host system 205 (e.g., in response to receiving access commands from the host system 205). The memory devices 240 may include one or more memory devices as described with reference to FIG. 1. For example, the memory devices 240 may include NAND memory, PCM, self-selecting memory, 3D cross point or other chalcogenide-based memories, FERAM, MRAM, NOR (e.g., NOR flash) memory, STT-MRAM, CBRAM, RRAM, or OxRAM, among other examples.

The memory system 210 may include a storage controller 230 for controlling the passing of data directly to and from the memory devices 240 (e.g., for storing data, for retrieving data, for determining memory locations in which to store data and from which to retrieve data). The storage controller 230 may communicate with memory devices 240 directly or via a bus (not shown), which may include using a protocol specific to each type of memory device 240. In some cases, a single storage controller 230 may be used to control multiple memory devices 240 of the same or different types. In some cases, the memory system 210 may include multiple storage controllers 230 (e.g., a different storage controller 230 for each type of memory device 240). In some cases, a storage controller 230 may implement aspects of a local controller 135 as described with reference to FIG. 1.

The memory system 210 may include an interface 220 for communication with the host system 205, and a buffer 225 for temporary storage of data being transferred between the host system 205 and the memory devices 240. The interface 220, buffer 225, and storage controller 230 may support translating data between the host system 205 and the memory devices 240 (e.g., as shown by a data path 250), and may be collectively referred to as data path components.

Using the buffer 225 to temporarily store data during transfers may allow data to be buffered while commands are being processed, which may reduce latency between commands and may support arbitrary data sizes associated with commands. This may also allow bursts of commands to be handled, and the buffered data may be stored, or transmitted, or both (e.g., after a burst has stopped). The buffer 225 may include relatively fast memory (e.g., some types of volatile memory, such as SRAM or DRAM), or hardware accelerators, or both to allow fast storage and retrieval of data to and from the buffer 225. The buffer 225 may include data path switching components for bi-directional data transfer between the buffer 225 and other components.

A temporary storage of data within a buffer 225 may refer to the storage of data in the buffer 225 during the execution of access commands. For example, after completion of an access command, the associated data may no longer be maintained in the buffer 225 (e.g., may be overwritten with data for additional access commands). In some examples, the buffer 225 may be a non-cache buffer. For example, data may not be read directly from the buffer 225 by the host system 205. In some examples, read commands may be added to a queue without an operation to match the address to addresses already in the buffer 225 (e.g., without a cache address match or lookup operation).

The memory system 210 also may include a memory system controller 215 for executing the commands received from the host system 205, which may include controlling the data path components for the moving of the data. The memory system controller 215 may be an example of the memory system controller 115 as described with reference to FIG. 1. A bus 235 may be used to communicate between the system components.

In some cases, one or more queues (e.g., a command queue 260, a buffer queue 265, a storage queue 270) may be used to control the processing of access commands and the movement of corresponding data. This may be beneficial, for example, if more than one access command from the host system 205 is processed concurrently by the memory system 210. The command queue 260, buffer queue 265, and storage queue 270 are depicted at the interface 220, memory system controller 215, and storage controller 230, respectively, as examples of a possible implementation. However, queues, if implemented, may be positioned anywhere within the memory system 210.

Data transferred between the host system 205 and the memory devices 240 may be conveyed along a different path in the memory system 210 than non-data information (e.g., commands, status information). For example, the system components in the memory system 210 may communicate with each other using a bus 235, while the data may use the data path 250 through the data path components instead of the bus 235. The memory system controller 215 may control how and if data is transferred between the host system 205 and the memory devices 240 by communicating with the data path components over the bus 235 (e.g., using a protocol specific to the memory system 210).

If a host system 205 transmits access commands to the memory system 210, the commands may be received by the interface 220 (e.g., according to a protocol, such as a UFS protocol or an eMMC protocol). Thus, the interface 220 may be considered a front end of the memory system 210. After receipt of each access command, the interface 220 may communicate the command to the memory system controller 215 (e.g., via the bus 235). In some cases, each command may be added to a command queue 260 by the interface 220 to communicate the command to the memory system controller 215.

The memory system controller 215 may determine that an access command has been received based on the communication from the interface 220. In some cases, the memory system controller 215 may determine the access command has been received by retrieving the command from the command queue 260. The command may be removed from the command queue 260 after it has been retrieved (e.g., by the memory system controller 215). In some cases, the memory system controller 215 may cause the interface 220 (e.g., via the bus 235) to remove the command from the command queue 260.

After a determination that an access command has been received, the memory system controller 215 may execute the access command. For a read command, this may include obtaining data from one or more memory devices 240 and transmitting the data to the host system 205. For a write command, this may include receiving data from the host system 205 and moving the data to one or more memory devices 240. In either case, the memory system controller 215 may use the buffer 225 for, among other things, temporary storage of the data being received from or sent to the host system 205. The buffer 225 may be considered a middle end of the memory system 210. In some cases, buffer address management (e.g., pointers to address locations in the buffer 225) may be performed by hardware (e.g., dedicated circuits) in the interface 220, buffer 225, or storage controller 230.

To process a write command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the write command.

In some cases, a buffer queue 265 may be used to control a flow of commands associated with data stored in the buffer 225, including write commands. The buffer queue 265 may include the access commands associated with data currently stored in the buffer 225. In some cases, the commands in the command queue 260 may be moved to the buffer queue 265 by the memory system controller 215 and may remain in the buffer queue 265 while the associated data is stored in the buffer 225. In some cases, each command in the buffer queue 265 may be associated with an address at the buffer 225. For example, pointers may be maintained that indicate where in the buffer 225 the data associated with each command is stored. Using the buffer queue 265, multiple access commands may be received sequentially from the host system 205 and at least portions of the access commands may be processed concurrently.

If the buffer 225 has sufficient space to store the write data, the memory system controller 215 may cause the interface 220 to transmit an indication of availability to the host system 205 (e.g., a "ready to transfer" indication), which may be performed in accordance with a protocol (e.g., a UFS protocol, an eMMC protocol). As the interface 220 receives the data associated with the write command from the host system 205, the interface 220 may transfer the data to the buffer 225 for temporary storage using the data path 250. In some cases, the interface 220 may obtain (e.g., from the buffer 225, from the buffer queue 265) the location within the buffer 225 to store the data. The interface 220 may indicate to the memory system controller 215 (e.g., via the bus 235) if the data transfer to the buffer 225 has been completed.

After the write data has been stored in the buffer 225 by the interface 220, the data may be transferred out of the buffer 225 and stored in a memory device 240, which may involve operations of the storage controller 230. For example, the memory system controller 215 may cause the storage controller 230 to retrieve the data from the buffer 225 using the data path 250 and transfer the data to a memory device 240. The storage controller 230 may be considered a back end of the memory system 210. The storage controller 230 may indicate to the memory system controller 215 (e.g., via the bus 235) that the data transfer to one or more memory devices 240 has been completed.

In some cases, a storage queue 270 may support a transfer of write data. For example, the memory system controller 215 may push (e.g., via the bus 235) write commands from the buffer queue 265 to the storage queue 270 for processing. The storage queue 270 may include entries for each access command. In some examples, the storage queue 270 may additionally include a buffer pointer (e.g., an address) that may indicate where in the buffer 225 the data associated with the command is stored and a storage pointer (e.g., an address) that may indicate the location in the memory devices 240 associated with the data. In some cases, the storage controller 230 may obtain (e.g., from the buffer 225, from the buffer queue 265, from the storage queue 270) the location within the buffer 225 from which to obtain the data. The storage controller 230 may manage the locations within the memory devices 240 to store the data (e.g., performing wear-leveling, performing garbage collection). The entries may be added to the storage queue 270 (e.g., by the memory system controller 215). The entries may be removed from the storage queue 270 (e.g., by the storage controller 230, by the memory system controller 215) after completion of the transfer of the data.

To process a read command received from the host system 205, the memory system controller 215 may determine if the buffer 225 has sufficient available space to store the data associated with the command. For example, the memory system controller 215 may determine (e.g., via firmware, via controller firmware), an amount of space within the buffer 225 that may be available to store data associated with the read command.

In some cases, the buffer queue 265 may support buffer storage of data associated with read commands in a similar manner as discussed with respect to write commands. For example, if the buffer 225 has sufficient space to store the read data, the memory system controller 215 may cause the storage controller 230 to retrieve the data associated with the read command from a memory device 240 and store the data in the buffer 225 for temporary storage using the data path 250. The storage controller 230 may indicate to the memory system controller 215 (e.g., via the bus 235) when the data transfer to the buffer 225 has been completed.

In some cases, the storage queue 270 may be used to aid with the transfer of read data. For example, the memory system controller 215 may push the read command to the storage queue 270 for processing. In some cases, the storage controller 230 may obtain (e.g., from the buffer 225, from the storage queue 270) the location within one or more memory devices 240 from which to retrieve the data. In some cases, the storage controller 230 may obtain (e.g., from the buffer queue 265) the location within the buffer 225 to store the data. In some cases, the storage controller 230 may obtain (e.g., from the storage queue 270) the location within the buffer 225 to store the data. In some cases, the memory system controller 215 may move the command processed by the storage queue 270 back to the command queue 260.

After the data has been stored in the buffer 225 by the storage controller 230, the data may be transferred from the buffer 225 and sent to the host system 205. For example, the memory system controller 215 may cause the interface 220 to retrieve the data from the buffer 225 using the data path 250 and transmit the data to the host system 205 (e.g., according to a protocol, such as a UFS protocol or an eMMC protocol). For example, the interface 220 may process the command from the command queue 260 and may indicate to the memory system controller 215 (e.g., via the bus 235) that the data transmission to the host system 205 has been completed.

The memory system controller 215 may execute received commands according to an order (e.g., a first-in-first-out order, according to the order of the command queue 260). For each command, the memory system controller 215 may cause data corresponding to the command to be moved into and out of the buffer 225, as discussed herein. As the data is moved into and stored within the buffer 225, the command may remain in the buffer queue 265. A command may be removed from the buffer queue 265 (e.g., by the memory system controller 215) if the processing of the command has been completed (e.g., if data corresponding to the access command has been transferred out of the buffer 225). If a command is removed from the buffer queue 265, the address previously storing the data associated with that command may be available to store data associated with a new command.

In some examples, the memory system controller 215 may be configured for operations associated with one or more memory devices 240. For example, the memory system controller 215 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., LBAs) associated with commands from the host system 205 and physical addresses (e.g., physical block addresses) associated with memory cells within the memory devices 240. For example, the host system 205 may issue commands indicating one or more LBAs and the memory system controller 215 may identify one or more physical block addresses indicated by the LBAs. In some cases, one or more contiguous LBAs may correspond to noncontiguous physical block addresses. In some cases, the storage controller 230 may be configured to perform one or more of the described operations in conjunction with or instead of the memory system controller 215. In some cases, the memory system controller 215 may perform the functions of the storage controller 230 and the storage controller 230 may be omitted.

Techniques described herein provide for the memory system 210 to disable the automatic suspends (which may be referred to as suspend procedures) during a sanitize operation. For example, if the memory system 210 receives a sanitize command from the host system 205 (e.g., via the interface 220), the memory system 210 may issue a command or other indication (e.g., a set feature command or some other type of command) to switch one or more memory devices 240 from the first suspend mode to a second suspend mode that is associated with no suspends or on-demand suspends (e.g., in response to detection of a command), but does not support automatic suspends. The second suspend mode may thereby disable the periodic suspensions during erase operations, so that the memory system 210 may perform the series of erase operations to sanitize the system without interruption, thereby decreasing latency and improving a reliability of the sanitize operation. The command may be issued, for example, from the memory system controller 215 to the one or more memory devices 240, from the storage controller 230 to the one or more memory devices 240, or between one or more other components within the memory system 210. The memory system 210 may issue another command or other indication to switch back to the first suspend mode after the sanitize operation is complete, such that the memory system 210 may continue to periodically suspend or pause during other types of erase operations. The memory system 210 may update a sanitize status log page, or otherwise indicate a status of the sanitize operation to the host system 205 during the sanitize operation. The host system 205 may refrain from issuing any I/O commands via the interface 220 until the sanitize operation is complete.

Figure 3:
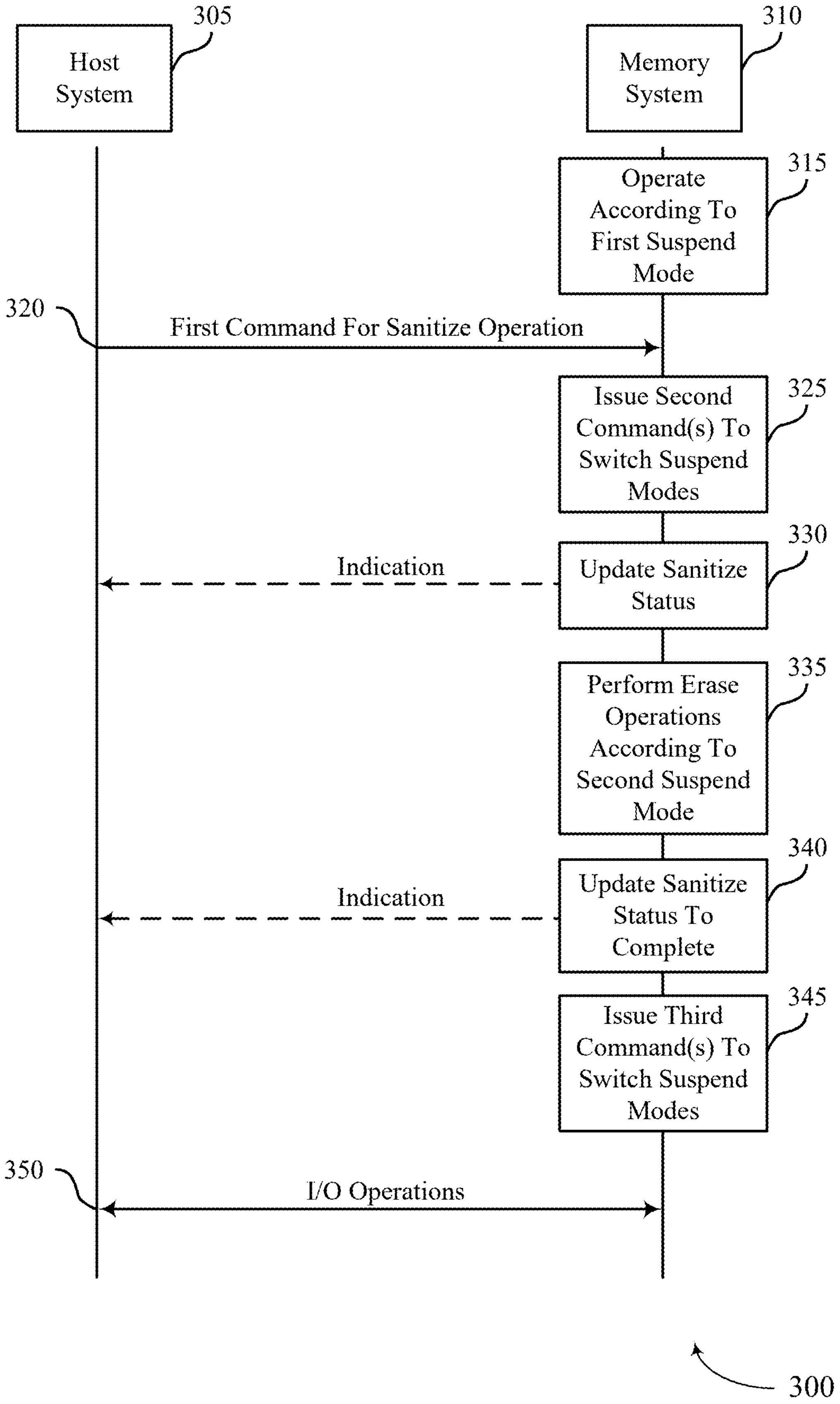
FIG. 3 shows an example of a process flow that supports techniques for an erase suspend mode during a sanitize operation for a memory system in accordance with examples as disclosed herein.

FIG. 3 shows an example of a process flow 300 that supports erase suspend mode during a sanitize operation for a memory system in accordance with examples as disclosed herein. In some cases, aspects of the process flow 300 may implement or be implemented by aspects of FIGS. 1 and 2. For example, the process flow 300 illustrates signals exchanged between and operations performed by a memory system 310 and a host system 305, which may be examples of a memory system 110, 210, and a host system 105, 205, as described with reference to FIGS. 1 and 2. The process flow 300 may illustrate a process for disabling erase suspensions during a sanitize operation to reduce latency and improve system performance.

In the following description of the process flow 300, the operations may be performed in a different order than the order shown, or other operations may be added or removed from the process flow 300. For example, some operations may also be left out of the process flow 300, may be performed in different orders or at different times, or other operations may be added to the process flow 300. Although the memory system 310 and the host system 305 are illustrated as performing the operations of the process flow 300, some aspects of some operations may also be performed by one or more other memory systems, memory devices, host systems, controllers, or other electronic devices (e.g., as described herein with respect to FIG. 1).

At 315, the memory system 310 may operate according to a first suspend mode. The first suspend mode may be associated with periodic or semi-static suspensions during erase operations as well as on-demand suspensions during erase operations. For example, the first suspend mode may be associated with both the auto-fixed suspend mode and the on-demand suspend mode described with reference to FIG. 1. The memory system 310 may receive and perform access operations based on commands received from the host system 305. If the memory system 310 receives an erase command from the host system 305, the memory system 310 may perform the erase operation by applying (e.g., based on an erase algorithm), a series of one or more erase voltage pulses to memory cells identified in the erase command. The memory system 310 may, in some cases, perform an erase verification between one or more of the erase voltage pulses to determine whether the erase is complete or not. The memory system 310 may additionally, or alternatively, apply one or more erase configuration settings before applying a first voltage pulse, and the remaining erase operation may be performed according to the one or more erase configuration settings.

In accordance with the first erase suspend mode, the memory system 310 may suspend (e.g., pause) the erase operation one or more times between application of the erase voltage pulses based on a periodicity or at some other defined time instances or intervals. The suspension(s) may last for some duration (e.g., 150 microseconds, some other duration) such that the memory system 310 may execute one or more access operations during the suspension period if the memory system 310 has received any commands from the host system 305. The memory system 310 may additionally suspend the erase operation at one or more other time instances different than the defined time instances for the auto-fixed suspension if the memory system 310 receives an I/O command from the host system 305. The memory system 310 may execute the associated operation before resuming the erase operation.

At 320, the host system 305 may issue a first command to the memory system 310. The first command may be a sanitize command (e.g., NVMe Sanitize, or some other command) that triggers a sanitize operation associated with multiple erases of memory blocks from the memory system 310. In some examples, the sanitize operation may be referred to as a system wipe operation or a clear operation, in which the memory system 310 may delete (e.g., erase) all memory blocks within a drive, or some other relatively large quantity of memory blocks in a sequential or consecutive manner. In some examples, the sanitize operation may be per device. That is, one memory device may be sanitized and other memory devices may continue regular operations (e.g., may not be sanitized) in response to a given command. Additionally, or alternatively, all memory devices within the memory system 310 may be sanitized. The sanitize command may indicate one or more addresses associated with the sanitize command.

The host system 305 may not issue I/O commands to the memory system 310 during a sanitize operation. That is, the host system 305 may not issue any other I/O commands to the memory system 310 after the host system 305 issues the first command unless the host system 305 receives an indication that the sanitize operation is complete. The host system 305 may be configured to refrain from issuing I/O commands during sanitize operations, or may operate according to one or more protocols or specifications that disallow I/O operations to a memory device during a sanitize operation of the device.

At 325, in response to receiving the first command that triggers the sanitize operation, the memory system 310 may issue a second command. For example, a set feature command may be issued to one or more designated addresses and including a value that indicates to switch the suspend mode in the memory (e.g., NAND memory). The second command may thereby switch one or more memory devices within the memory system 310 from the first suspend mode to a second suspend mode that is associated with no suspensions or on-demand suspensions performed in direct response to detection of an I/O command in a command queue of the memory system 310. That is, the second suspend mode may disable the periodic (e.g., automatic) suspensions during erase operations. The memory system 310 may disable these suspensions to reduce latency of the sanitize operation. Since the host system 305 and the memory system 310 are configured to not perform access operations or other I/O operations during the sanitize operation, any suspensions during the sanitize operation may extend a duration of the sanitize operation and the memory system 310 may be idle during the suspensions, or may otherwise not take advantage of the suspension times, thereby increasing latency. By disabling such suspensions, the memory system 310 may perform a series of sequential erase operations without pauses or other interruptions for suspensions, which may provide for the memory system 310 to wipe the drive relatively quickly, among other advantages.

In some examples, issuing the second command may include transmitting the second command via a bus of the memory system to one or more memory devices. The second command may be generated by a controller of the memory system, or by some other component, as described with reference to FIGS. 1 and 2.

The second command may include an address of one or more target memory devices as well as a suspend mode value, among one or more other parameters or fields. The suspend mode value may include one or more bits set to indicate a suspend mode which the memory device is to operate in. For example, the suspend mode value in the second command may indicate for the corresponding memory device(s) to switch from the first suspend mode to the second suspend mode. In some examples, a set feature or set feature LUN command with a given address (e.g., address "85h" or some other address) and a given value (e.g., a value of "0" for a parameter P1) may switch a mode from the first suspend mode (e.g., auto fixed and on demand) to the second suspend mode (e.g., on demand only). In some examples, the memory system 310 may issue a respective second command to each memory device of multiple memory devices within the memory system 310, and each command may have a different target address. Additionally, or alternatively, the memory system 310 may issue a single command to multiple devices, and the command may include more than one target address. The memory devices that are targeted for the suspend mode switch may be memory devices that are being sanitized, in some examples.

At 330, the memory system 310 may update a sanitize status log page associated with the memory system 310 based on initiating the sanitize operation. That is, the memory system 310 may indicate, to the host system 305, that the memory system 310 is starting the sanitize operation. In some examples, updating the status log page may include transmitting an indication to the host system 305 regarding a status of the sanitize operation, setting a value of a flag, pin, or mode register of the memory system 310, or any combination thereof. In some examples, the memory system 310 may actively provide an indication to the host system 305 regarding a status of the sanitize operation. In some examples, the memory system 310 may not actively provide an indication to the host system 305 regarding a status of the sanitize operation and may instead update information in the memory system 310 that can be accessed by the host system 305 at a later time (e.g., through the host system 305 polling or reading information at the memory system) or may be otherwise available for indication to the host system 305 (e.g., through setting a value of a flag or a pin or other mechanism).

At 335, the memory system 310 may perform multiple erase operations to delete the memory blocks from the memory system 310 based on the sanitize operation. The memory system 310 may perform the erase operations according to the second suspend mode. For example, the memory system 310 may perform an initial PBE operation, followed by one or more iterations of a voltage erase pulse application and an erase pulse verification, without pausing or suspending the erase sequence at any fixed intervals. In some examples, the memory system 310 may apply the voltage erase pulses according to an erase sequence or algorithm, as described with reference to FIG. 1, and a time period between application of each erase voltage pulse may be less than a threshold time based on the second suspend mode (e.g., based on there not being any suspensions). That is, the memory system 310 may perform the erase operations back-to-back, each operation including application of a pulse then verification of the pulse, without interruption.

In some examples, the memory system 310 may periodically update the status log page during the sanitize operation. For example, the memory system 310 may periodically transmit an indication or set a value to indicate, to the host system 305, a status of the sanitize operation (e.g., how many memory blocks have been erased, operation pending, operation paused, operation complete, or the like). In some examples, the indication may be an update to a status log page accessible to the memory system 310 and the host system 305.

At 340, the memory system 310 may complete the sanitize operation and may update the sanitize status to complete. For example, the memory system 310 may delete all of the requested memory blocks, and may transmit an indication to the host system 305 that the sanitize operation is complete. In some examples, the memory system 310 may actively provide an indication to the host system 305 that the sanitize operation is complete. In some examples, the memory system 310 may not actively provide an indication to the host system 305 that the sanitize operation is complete and may instead update information in the memory system 310 that can be accessed by the host system 305 at a later time (e.g., through the host system 305 polling or reading information at the memory system) or may be otherwise available for indication to the host system 305 (e.g., through setting a value of a flag or a pin or other mechanism).

At 345, the memory system 310 may issue one or more third commands to one or more memory devices to switch from the second suspend mode back to the first suspend mode based on the sanitize operation being complete. The one or more third commands may be set feature commands, or some other type of command, that each include one or more target addresses and a suspend mode value that indicates which suspend mode to switch to, as described with reference to the second command. In some examples, a set feature or set feature LUN command with a given address (e.g., address "85h" or some other address) and a given value (e.g., a value of "1" for a parameter P1) may switch a mode from the second suspend mode (e.g., on demand only) to the first suspend mode (e.g., auto fixed and on demand). The memory system 310 may switch the memory devices back to the first suspend mode when the memory devices are not performing a sanitize operation, such that the memory devices may suspend at fixed intervals (e.g., in addition to in response to I/O commands) while performing other types of erase operations.

At 350, the host system 305 may issue one or more I/O commands (e.g., access commands) to the memory system 310 based on the indication that the sanitize operation is complete. That is, the host system 305 may transmit any I/O commands that the host system 305 was not allowed to transmit during the sanitize operation. The memory system 310 may execute the I/O operations and exchange relevant data with the host system 305 accordingly. In some examples, if the host system 305 issues an erase operation, the memory system 310 may apply one or more erase voltage pulses to a corresponding set of memory blocks indicated via the erase command, and the memory system 310 may suspend the erase voltage operation for at least a suspend duration after each voltage pulse application and voltage pulse verification based on switching back to the first suspend mode at 345.

The memory system 310 may thereby refrain from pausing during a sanitize operation, even if the memory system 310 supports suspensions during other types of erase operations, to improve efficiency and reduce latency associated with sanitize operations, among other examples.

Figure 4:
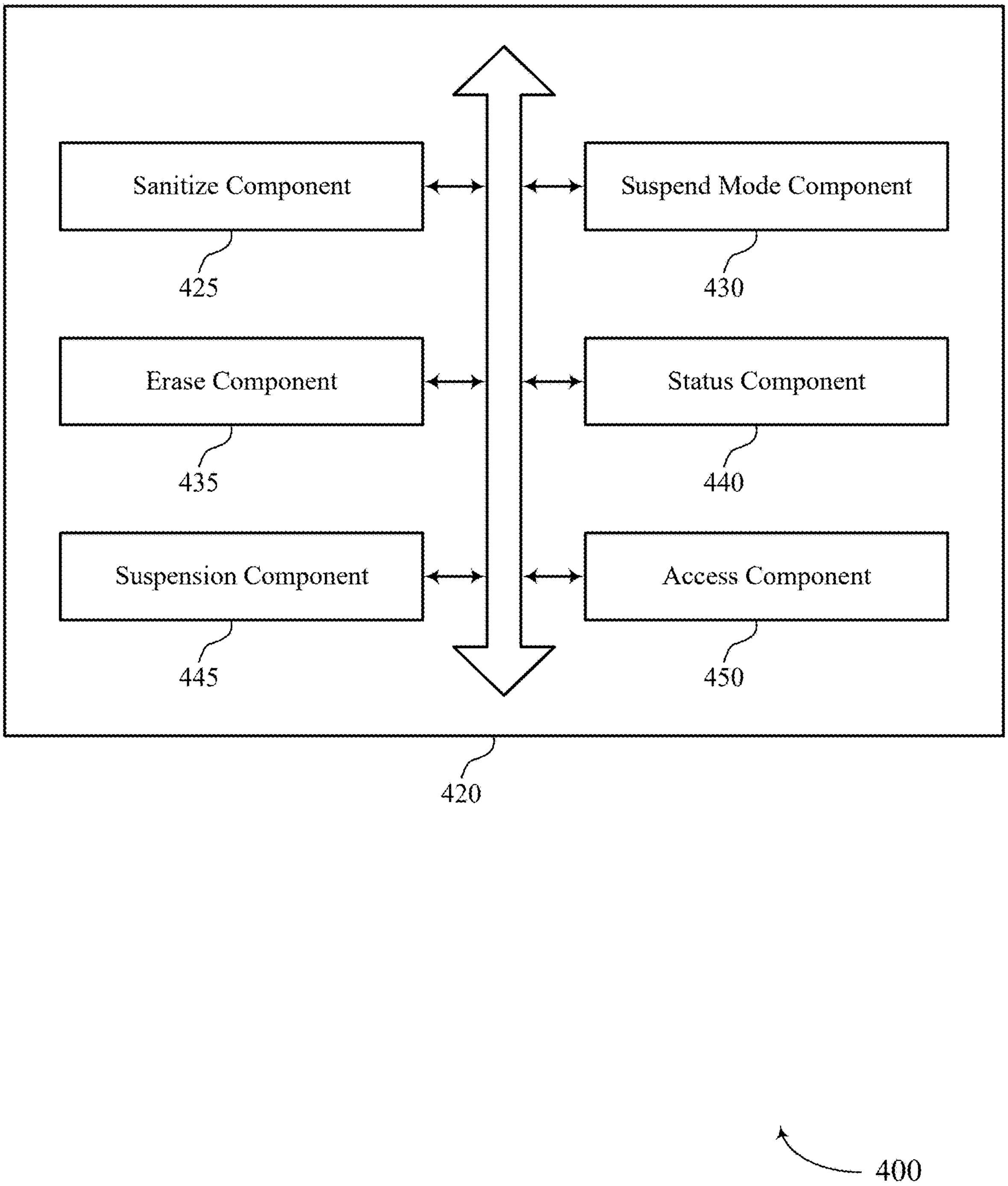
FIG. 4 shows a block diagram of a memory system that supports techniques for an erase suspend mode during a sanitize operation for a memory system in accordance with examples as disclosed herein.

FIG. 4 shows a block diagram 400 of a memory system 420 that supports erase suspend mode during a sanitize operation for a memory system in accordance with examples as disclosed herein. The memory system 420 may be an example of aspects of a memory system as described with reference to FIGS. 1 through 3. The memory system 420, or various components thereof, may be an example of means for performing various aspects of erase suspend mode during a sanitize operation for a memory system as described herein. For example, the memory system 420 may include a sanitize component 425, a suspend mode component 430, an erase component 435, a status component 440, a suspension component 445, an access component 450, or any combination thereof. Each of these components, or components of subcomponents thereof (e.g., one or more processors, one or more memories), may communicate, directly or indirectly, with one another (e.g., via one or more buses).

The sanitize component 425 may be configured as or otherwise support a means for receiving a first command for an operation associated with a plurality of erase operations for erasing a plurality of memory blocks from the memory system, the operation including a sanitize operation. The suspend mode component 430 may be configured as or otherwise support a means for issuing, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions. The erase component 435 may be configured as or otherwise support a means for performing, in accordance with the second suspend mode that disables the one or more suspensions, the plurality of erase operations to delete the plurality of memory blocks from the memory system based at least in part on the operation.

In some examples, the sanitize component 425 may be configured as or otherwise support a means for completing the operation based at least in part on performing the plurality of erase operations to delete the plurality of memory blocks from the memory system. In some examples, the suspend mode component 430 may be configured as or otherwise support a means for issuing, based at least in part on completing the operation, a third command to switch from the second suspend mode back to the first suspend mode.

In some examples, the erase component 435 may be configured as or otherwise support a means for receiving an erase command to erase a subset of memory blocks from the memory system. In some examples, the erase component 435 may be configured as or otherwise support a means for applying a plurality of erase voltage pulses to the subset of memory blocks based at least in part on receiving the erase command. In some examples, the suspension component 445 may be configured as or otherwise support a means for suspending the plurality of erase voltage pulses for at least a suspend duration based at least in part on switching from the second suspend mode to the first suspend mode.

In some examples, the sanitize component 425 may be configured as or otherwise support a means for transmitting an indication that the operation is complete and the plurality of memory blocks are erased based at least in part on completing the operation. In some examples, the access component 450 may be configured as or otherwise support a means for receiving one or more access commands based at least in part on the indication that the operation is complete.

In some examples, to support performing the plurality of erase operations, the erase component 435 may be configured as or otherwise support a means for applying a plurality of erase voltage pulses to the plurality of memory blocks according to an erase sequence, where a time period between application of each erase voltage pulse of the plurality of erase voltage pulses is less than a threshold time period based at least in part on the second suspend mode.

In some examples, to support issuing the second command, the suspend mode component 430 may be configured as or otherwise support a means for transmitting, via a bus of the memory system, the second command including a suspend mode value and one or more addresses associated with one or more memory dies to switch between suspend modes, where the suspend mode value indicates to switch from the first suspend mode to the second suspend mode.

In some examples, the suspend mode component 430 may be configured as or otherwise support a means for issuing a plurality of second commands including at least the second command to a plurality of dies of the memory system, where each second command of the plurality of second commands indicates an address associated with a respective die of the plurality of dies to switch the respective die from the first suspend mode to the second suspend mode.

In some examples, the status component 440 may be configured as or otherwise support a means for performing periodic updates to a status log page associated with the memory system based at least in part on performing the plurality of erase operations, where the status log page indicates a status of the operation.

In some examples, the first suspend mode and the second suspend mode are both associated with an on-demand suspension mode that enables one or more erase suspensions based at least in part on I/O commands received by the memory system.

In some examples, the one or more suspensions that each suspend the plurality of erase operations for a respective suspend duration are associated with a periodicity associated with the first suspend mode.

In some examples, the described functionality of the memory system 420, or various components thereof, may be supported by or may refer to at least a portion of at least one processor, where such at least one processor may include one or more processing elements (e.g., a controller, a microprocessor, a microcontroller, a digital signal processor, a state machine, discrete gate logic, discrete transistor logic, discrete hardware components, or any combination of one or more of such elements). In some examples, the described functionality of the memory system 420, or various components thereof, may be implemented at least in part by instructions (e.g., stored in memory, non-transitory computer-readable medium) executable by such at least one processor.

Figure 5:
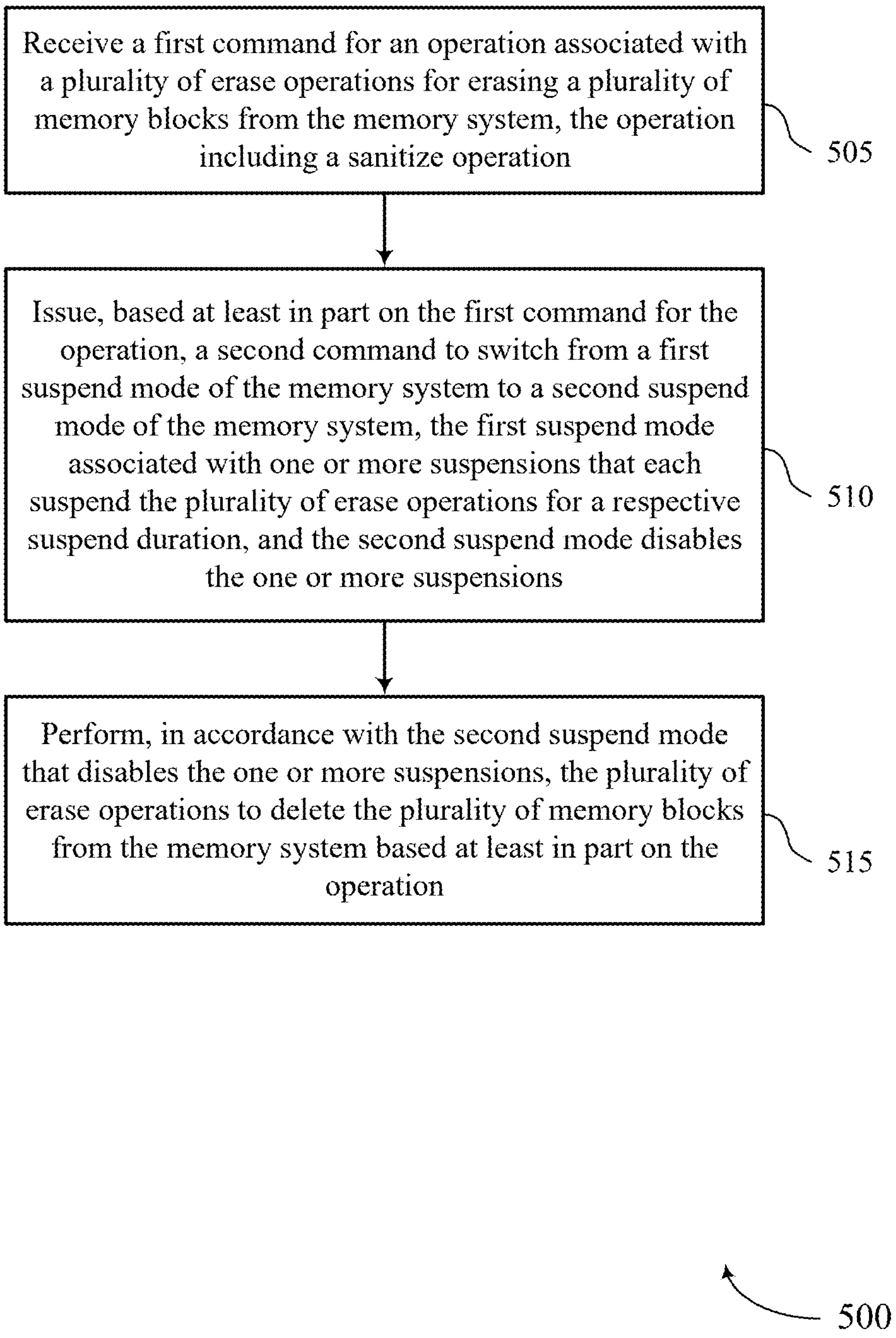
FIG. 5 shows a flowchart illustrating a method or methods that support techniques for an erase suspend mode during a sanitize operation for a memory system in accordance with examples as disclosed herein.

FIG. 5 shows a flowchart illustrating a method 500 that supports erase suspend mode during a sanitize operation for a memory system in accordance with examples as disclosed herein. The operations of method 500 may be implemented by a memory system or its components as described herein. For example, the operations of method 500 may be performed by a memory system as described with reference to FIGS. 1 through 4. In some examples, a memory system may execute a set of instructions to control the functional elements of the device to perform the described functions. Additionally, or alternatively, the memory system may perform aspects of the described functions using special-purpose hardware.

At 505, the method may include receiving a first command for an operation associated with a plurality of erase operations for erasing a plurality of memory blocks from the memory system, the operation including a sanitize operation. In some examples, aspects of the operations of 505 may be performed by a sanitize component 425 as described with reference to FIG. 4.

At 510, the method may include issuing, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions. In some examples, aspects of the operations of 510 may be performed by a suspend mode component 430 as described with reference to FIG. 4.

At 515, the method may include performing, in accordance with the second suspend mode that disables the one or more suspensions, the plurality of erase operations to delete the plurality of memory blocks from the memory system based at least in part on the operation. In some examples, aspects of the operations of 515 may be performed by an erase component 435 as described with reference to FIG. 4.

In some examples, an apparatus as described herein may perform a method or methods, such as the method 500. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for receiving a first command for an operation associated with a plurality of erase operations for erasing a plurality of memory blocks from the memory system, the operation including a sanitize operation; issuing, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions; and performing, in accordance with the second suspend mode that disables the one or more suspensions, the plurality of erase operations to delete the plurality of memory blocks from the memory system based at least in part on the operation.

Aspect 2: The method, apparatus, or non-transitory computer-readable medium of aspect 1, further including operations, features, circuitry, logic, means, or instructions, or any combination thereof for completing the operation based at least in part on performing the plurality of erase operations to delete the plurality of memory blocks from the memory system and issuing, based at least in part on completing the operation, a third command to switch from the second suspend mode back to the first suspend mode.

Aspect 3: The method, apparatus, or non-transitory computer-readable medium of aspect 2, further including operations, features, circuitry, logic, means, or instructions, or any combination thereof for receiving an erase command to erase a subset of memory blocks from the memory system; applying a plurality of erase voltage pulses to the subset of memory blocks based at least in part on receiving the erase command; and suspending the plurality of erase voltage pulses for at least a suspend duration based at least in part on switching from the second suspend mode to the first suspend mode.

Aspect 4: The method, apparatus, or non-transitory computer-readable medium of any of aspects 2 through 3, further including operations, features, circuitry, logic, means, or instructions, or any combination thereof for transmitting an indication that the operation is complete and the plurality of memory blocks are erased based at least in part on completing the operation and receiving one or more access commands based at least in part on the indication that the operation is complete.

Aspect 5: The method, apparatus, or non-transitory computer-readable medium of any of aspects 1 through 4, where performing the plurality of erase operations includes operations, features, circuitry, logic, means, or instructions, or any combination thereof for applying a plurality of erase voltage pulses to the plurality of memory blocks according to an erase sequence, where a time period between application of each erase voltage pulse of the plurality of erase voltage pulses is less than a threshold time period based at least in part on the second suspend mode.

Aspect 6: The method, apparatus, or non-transitory computer-readable medium of any of aspects 1 through 5, where issuing the second command includes operations, features, circuitry, logic, means, or instructions, or any combination thereof for transmitting, via a bus of the memory system, the second command including a suspend mode value and one or more addresses associated with one or more memory dies to switch between suspend modes, where the suspend mode value indicates to switch from the first suspend mode to the second suspend mode.

Aspect 7: The method, apparatus, or non-transitory computer-readable medium of any of aspects 1 through 6, further including operations, features, circuitry, logic, means, or instructions, or any combination thereof for issuing a plurality of second commands including at least the second command to a plurality of dies of the memory system, where each second command of the plurality of second commands indicates an address associated with a respective die of the plurality of dies to switch the respective die from the first suspend mode to the second suspend mode.

Aspect 8: The method, apparatus, or non-transitory computer-readable medium of any of aspects 1 through 7, further including operations, features, circuitry, logic, means, or instructions, or any combination thereof for performing periodic updates to a status log page associated with the memory system based at least in part on performing the plurality of erase operations, where the status log page indicates a status of the operation.

Aspect 9: The method, apparatus, or non-transitory computer-readable medium of any of aspects 1 through 8, where the first suspend mode and the second suspend mode are both associated with an on-demand suspension mode that enables one or more erase suspensions based at least in part on I/O commands received by the memory system.

Aspect 10: The method, apparatus, or non-transitory computer-readable medium of any of aspects 1 through 9, where the one or more suspensions that each suspend the plurality of erase operations for a respective suspend duration are associated with a periodicity associated with the first suspend mode.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal; however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" (e.g., "electrically coupling") may refer to a condition of moving from an open-circuit relationship between components in which signals are not presently capable of being communicated between the components over a conductive path to a closed-circuit relationship between components in which signals are capable of being communicated between components over the conductive path. If a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other if the switch is open. If a controller isolates two components, the controller affects a change that prevents signals from flowing between the components using a conductive path that previously permitted signals to flow.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed, and a second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed, and a second condition or action may occur directly as a result of the previous condition or action occurring independent of whether other conditions or actions occur. In some examples, a first condition or action may be performed, and a second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on," "based at least in part on," or "in response to" some other step, action, event, or condition may additionally, or alternatively, (e.g., in an alternative example), be performed "in direct response to" or "directly in response to" such other condition or action unless otherwise specified.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In some other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorus, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as an n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" if a voltage greater than or equal to the transistor's threshold voltage is applied to the transistor gate. The transistor may be "off" or "deactivated" if a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processing system (e.g., one or more processors, one or more controllers, control circuitry, processing circuitry, logic circuitry), firmware, or any combination thereof. If implemented in software executed by a processing system, the functions may be stored on or transmitted over as one or more instructions (e.g., code) on a computer-readable medium. Due to the nature of software, functions described herein can be implemented using software executed by a processing system, hardware, firmware, hardwiring, or combinations of any of these. Features implementing functions may be physically located at various positions, including being distributed such that portions of functions are implemented at different physical locations.

Illustrative blocks and modules described herein may be implemented or performed with one or more processors, such as a DSP, an ASIC, an FPGA, discrete gate logic, discrete transistor logic, discrete hardware components, other programmable logic device, or any combination thereof designed to perform the functions described herein. A processor may be an example of a microprocessor, a controller, a microcontroller, a state machine, or other types of processors. A processor may also be implemented as at least one of one or more computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium, or combination of multiple media, which can be accessed by a computer. By way of example, and not limitation, non-transitory computer-readable media can comprise RAM, ROM, electrically erasable programmable read-only memory (EEPROM), optical disk storage, magnetic disk storage or other magnetic storage devices, or any other non-transitory medium or combination of media that can be used to carry or store desired program code means in the form of instructions or data structures and that can be accessed by a computer, or one or more processors.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A memory system, comprising:
- one or more memories storing processor-executable code; and
- one or more processors coupled with the one or more memories and individually or collectively operable to execute the code to cause the memory system to:
  - receive a first command for an operation associated with a plurality of erase operations for erasing a plurality of memory blocks from the memory system, the operation comprising a sanitize operation;
  - issue, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions; and
  - perform, in accordance with the second suspend mode that disables the one or more suspensions, the plurality of erase operations to delete the plurality of memory blocks from the memory system based at least in part on the operation.

2. The memory system of claim 1, wherein the one or more processors are individually or collectively further operable to execute the code to cause the memory system to:
- complete the operation based at least in part on performing the plurality of erase operations to delete the plurality of memory blocks from the memory system; and
- issue, based at least in part on completing the operation, a third command to switch from the second suspend mode back to the first suspend mode.

3. The memory system of claim 2, wherein the one or more processors are individually or collectively further operable to execute the code to cause the memory system to:
- receive an erase command to erase a subset of memory blocks from the memory system;
- apply a plurality of erase voltage pulses to the subset of memory blocks based at least in part on receiving the erase command; and
- suspend the plurality of erase voltage pulses for at least a suspend duration based at least in part on switching from the second suspend mode to the first suspend mode.

4. The memory system of claim 2, wherein the one or more processors are individually or collectively further operable to execute the code to cause the memory system to:
- transmit an indication that the operation is complete and the plurality of memory blocks are erased based at least in part on completing the operation; and
- receive one or more access commands based at least in part on the indication that the operation is complete.

5. The memory system of claim 1, wherein, to perform the plurality of erase operations, the one or more processors are individually or collectively operable to execute the code to cause the memory system to:
- apply a plurality of erase voltage pulses to the plurality of memory blocks according to an erase sequence, wherein a time period between application of each erase voltage pulse of the plurality of erase voltage pulses is less than a threshold time period based at least in part on the second suspend mode.

6. The memory system of claim 1, wherein, to issue the second command, the one or more processors are individually or collectively operable to execute the code to cause the memory system to:
- transmit, via a bus of the memory system, the second command comprising a suspend mode value and one or more addresses associated with one or more memory dies to switch between suspend modes, wherein the suspend mode value indicates to switch from the first suspend mode to the second suspend mode.

7. The memory system of claim 1, wherein the one or more processors are individually or collectively further operable to execute the code to cause the memory system to:
- issue a plurality of second commands comprising at least the second command to a plurality of dies of the memory system, wherein each second command of the plurality of second commands indicates an address associated with a respective die of the plurality of dies to switch the respective die from the first suspend mode to the second suspend mode.

8. The memory system of claim 1, wherein the one or more processors are individually or collectively further operable to execute the code to cause the memory system to:
- perform periodic updates to a status log page associated with the memory system based at least in part on performing the plurality of erase operations, wherein the status log page indicates a status of the operation.

9. The memory system of claim 1, wherein the first suspend mode and the second suspend mode are both associated with an on-demand suspension mode that enables one or more erase suspensions based at least in part on input/output commands received by the memory system.

10. The memory system of claim 1, wherein the one or more suspensions that each suspend the plurality of erase operations for a respective suspend duration are associated with a periodicity associated with the first suspend mode.

11. A method at a memory system, comprising:
- receiving a first command for an operation associated with a plurality of erase operations for erasing a plurality of memory blocks from the memory system, the operation comprising a sanitize operation;
- issuing, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions; and performing, in accordance with the second suspend mode that disables the one or more suspensions, the plurality of erase operations to delete the plurality of memory blocks from the memory system based at least in part on the operation.

12. The method of claim 11, further comprising:

completing the operation based at least in part on performing the plurality of erase operations to delete the plurality of memory blocks from the memory system; and issuing, based at least in part on completing the operation, a third command to switch from the second suspend mode back to the first suspend mode.

13. The method of claim 12, further comprising:

receiving an erase command to erase a subset of memory blocks from the memory system;

applying a plurality of erase voltage pulses to the subset of memory blocks based at least in part on receiving the erase command; and suspending the plurality of erase voltage pulses for at least a suspend duration based at least in part on switching from the second suspend mode to the first suspend mode.

14. The method of claim 12, further comprising:

transmitting an indication that the operation is complete and the plurality of memory blocks are erased based at least in part on completing the operation; and receiving one or more access commands based at least in part on the indication that the operation is complete.

15. The method of claim 11, wherein performing the plurality of erase operations comprises:

applying a plurality of erase voltage pulses to the plurality of memory blocks according to an erase sequence, wherein a time period between application of each erase voltage pulse of the plurality of erase voltage pulses is less than a threshold time period based at least in part on the second suspend mode.

16. The method of claim 11, wherein issuing the second command comprises:

transmitting, via a bus of the memory system, the second command comprising a suspend mode value and one or more addresses associated with one or more memory dies to switch between suspend modes, wherein the suspend mode value indicates to switch from the first suspend mode to the second suspend mode.

17. The method of claim 11, further comprising:

issuing a plurality of second commands comprising at least the second command to a plurality of dies of the memory system, wherein each second command of the plurality of second commands indicates an address associated with a respective die of the plurality of dies to switch the respective die from the first suspend mode to the second suspend mode.

18. The method of claim 11, further comprising:

performing periodic updates to a status log page associated with the memory system based at least in part on performing the plurality of erase operations, wherein the status log page indicates a status of the operation.

19. The method of claim 11, wherein the first suspend mode and the second suspend mode are both associated with an on-demand suspension mode that enables one or more erase suspensions based at least in part on input/output commands received by the memory system.

20. The method of claim 11, wherein the one or more suspensions that each suspend the plurality of erase operations for a respective suspend duration are associated with a periodicity associated with the first suspend mode.

21. A non-transitory computer-readable medium storing code, the code comprising instructions executable by one or more processors to:

receive a first command for an operation associated with a plurality of erase operations for erasing a plurality of memory blocks from a memory system, the operation comprising a sanitize operation;

issue, based at least in part on the first command for the operation, a second command to switch from a first suspend mode of the memory system to a second suspend mode of the memory system, the first suspend mode associated with one or more suspensions that each suspend the plurality of erase operations for a respective suspend duration, and the second suspend mode disables the one or more suspensions; and perform, in accordance with the second suspend mode that disables the one or more suspensions, the plurality of erase operations to delete the plurality of memory blocks from the memory system based at least in part on the operation.

22. The non-transitory computer-readable medium of claim 21, wherein the instructions are further executable by the one or more processors to:

complete the operation based at least in part on performing the plurality of erase operations to delete the plurality of memory blocks from the memory system; and issue, based at least in part on completing the operation, a third command to switch from the second suspend mode back to the first suspend mode.

23. The non-transitory computer-readable medium of claim 22, wherein the instructions are further executable by the one or more processors to:

receive an erase command to erase a subset of memory blocks from the memory system;

apply a plurality of erase voltage pulses to the subset of memory blocks based at least in part on receiving the erase command; and suspend the plurality of erase voltage pulses for at least a suspend duration based at least in part on switching from the second suspend mode to the first suspend mode.

24. The non-transitory computer-readable medium of claim 22, wherein the instructions are further executable by the one or more processors to:

transmit an indication that the operation is complete and the plurality of memory blocks are erased based at least in part on completing the operation; and receive one or more access commands based at least in part on the indication that the operation is complete.

25. The non-transitory computer-readable medium of claim 21, wherein the instructions to perform the plurality of erase operations are executable by the one or more processors to:

apply a plurality of erase voltage pulses to the plurality of memory blocks according to an erase sequence, wherein a time period between application of each erase voltage pulse of the plurality of erase voltage pulses is less than a threshold time period based at least in part on the second suspend mode.

* * * * *